(12) United States Patent
Feige et al.

(10) Patent No.: US 8,358,635 B2
(45) Date of Patent: Jan. 22, 2013

(54) METHODS AND APPARATUS FOR IMPLEMENTING NAT TRAVERSAL IN MOBILE IP

(75) Inventors: Gaetan Feige, L'Hay les Roses (FR); Rabih A. Dabboussi, Cary, NC (US); Kent K. Leung, Mountain View, CA (US); Milind M. Kulkarni, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1110 days.

(21) Appl. No.: 11/440,144

(22) Filed: May 23, 2006

(65) Prior Publication Data
US 2006/0209778 A1 Sep. 21, 2006

Related U.S. Application Data

(63) Continuation-in-part of application No. 10/034,302, filed on Dec. 28, 2001, now Pat. No. 7,079,520.

(51) Int. Cl.
*H04W 4/00* (2009.01)
(52) U.S. Cl. ........ 370/338; 370/352; 370/389; 370/392; 370/401
(58) Field of Classification Search .................. 370/338, 370/352, 389, 392, 40; 455/435.1
See application file for complete search history.

(56) References Cited

U.S. PATENT DOCUMENTS

| | | | |
|---|---|---|---|
| 4,692,918 A | 9/1987 | Elliott et al. | |
| 5,016,244 A | 5/1991 | Massey et al. | |
| 5,018,133 A | 5/1991 | Tsukakoshi et al. | |
| 5,218,600 A | 6/1993 | Schenkyr et al. | |
| 5,371,852 A | 12/1994 | Attanasio et al. | |
| 5,473,599 A | 12/1995 | Li et al. | |
| 6,434,627 B1 | 8/2002 | Millet et al. | |
| 6,567,664 B1 | 5/2003 | Bergenwall et al. | |
| 6,625,135 B1 * | 9/2003 | Johnson et al. | 370/332 |
| 6,839,338 B1 | 1/2005 | Amara et al. | |
| 6,856,624 B2 * | 2/2005 | Magret | 370/392 |
| 6,862,274 B1 * | 3/2005 | Tsao et al. | 370/338 |
| 7,079,520 B2 | 7/2006 | Feige et al. | |
| 7,082,118 B1 | 7/2006 | Sethi | |
| 7,155,235 B2 | 12/2006 | Veerepalli et al. | |
| 7,190,668 B1 | 3/2007 | Francis et al. | |
| 2001/0036184 A1 * | 11/2001 | Kinoshita et al. | 370/389 |
| 2003/0123421 A1 | 7/2003 | Feige et al. | |

(Continued)

OTHER PUBLICATIONS

Second Office Action, with translation, issued Dec. 1, 2006, for Chinese Patent Application No. 02802743.4, Methods and Apparatus for Implementing NAT Traversal in Mobile IP, filed Dec. 23, 2002, 7 pp.

(Continued)

*Primary Examiner* — Charles Appiah
*Assistant Examiner* — Jaime Holliday
(74) *Attorney, Agent, or Firm* — Weaver Austin Villeneuve & Sampson LLP (57) ABSTRACT

Methods and apparatus for establishing communication between a Mobile Node and a Home Agent are disclosed. The Home Agent receives a registration request packet from the Mobile Node, the registration request packet including an IP source address and a Home Agent address. The Home Agent then detects from the registration request packet when network address translation has been performed. When it has been detected that network address translation has been performed, a tunnel is set up between the Home Agent address and the IP source address.

33 Claims, 7 Drawing Sheets

U.S. PATENT DOCUMENTS

2004/0184420 A1 9/2004 Xu et al.

OTHER PUBLICATIONS

S. Kent and R. Atkinson, "Security Architecture for the Internet Protocol", RFC 2401, Nov. 1998, 50 pgs.
Release notes for 3Com Corporation, "*Conducting a Redundant Route for Network Resiliency*," Mar. 1994, *NET Builder Family Bridge/Router* pp. 26-29.
Uyless Black, "*TCP/IP and Related Protocols*," 1992, *McGraw-Hill, Inc.*, pp. 226-249.
T. Li, et al., RFC 2281 "*Cisco Hot Standby Router Protocol (HSRP)*," Mar. 1998.
C. Perkins, "*IP Mobility Support*," RFC 2002, IBM Corporation, Oct. 1996.
"*Mobile IP*," Release 12.0(1)T, pp. 1-55.
Montenegro, G., "*Reverse Tunneling for Mobile IP*," RFC 2344, Sun Microsystems, Inc., May 1998.
D. Harkins and D. Carrel, "*The Internet Key Exchange (IKE)*," Cisco Systems, Jun. 1998.
D. Cong and M. Hamlen, and C. Perkins, "*The Definitions of Managed Objects for IP Mobility Support using SMIv2*," RFC 2006, Motorola and IBM, Oct. 1996.
Aboba and Beadles, "*The Network Access Identifier*" RFC 2486, Jan. 1999.
Calhoun and Perkins, "*Mobile IP Network Access Identifier Extension, for Ipv4*", Jan. 12, 2000.
S. Deering, Network Working Group Request for Comments 1256, "*ICMP Router Discovery Message*", Xerox PARC, Sep. 1991, pp. 1-19.
Gleeson et al., Network Working Group Request for Comments 2764, "*A Framework for IP Based Virtual Private Networks*", Lucent Technologies, Feb. 2000, Copyright © the Internet Society (2000). All rights reserved, pp. 1-62.
Tsirtsis et al., Network Working Group Request for Comments 2766, "*Network Address Translation—Protocol Translation (NAT-PT)*", Campio Communications, Feb. 2000, Copyright (C) The Internet Society (2000). All Rights Reserved, pp. 1-21.
E. Rosen et al., Network Working Group Request for Comments 2547, "*BGP/MPLS VPNs*", Cisco Systems, Inc., Mar. 1999, Copyright (C) The Internet Society (1999). All Rights Reserved., pp. 1-25.
Levkowetz, H. et al., "*Mobile IP NAT/NAPT Traversal using UDP Tunneling*", Internet Draft, Nov. 8, 2001, 23 pages.
Khalil, Mohamed M. et al., "*Generalized NAI (GNAI) Extension for Mobile IPv4*", Internet Draft, Oct. 2001, 6 pages.

Adrangi, Farid and Prakash, Iyer, "*Mobile IPv4 Traversal Across Firewalls*", Internet Draft, Nov. 13, 2001, 30 pages.
Levkowetz and Vaarala, "Mobile IP Traversal of Network Address Translation (NAT) Devices," RFC 3519, Apr. 2003, 34 pages.
C. Perkins, "IP Mobility Support for IPv4," RFC 3220, Jan. 2002, 98 pages.
Leung et al, U.S. Appl. No. 10/420,402, Methods and Apparatus for Optimizing NAT Traversal for Mobile IP, filed Apr. 17, 2003.
Examiner's Communication pursuant to Article 96(2) EPC dated Apr. 6, 2005, for European Patent Application No. 02796082.2, Methods and Apparatus for Implementing NAT Traversal in Mobile IP, 6 pages.
PCT International Search Report, PCT/US02/41535 mailed May 8, 2003, 6 pages.
Vaarala, "Mobil IP NAT/NAPT/Firewall Traversal", Internet Draft, Jul. 12, 2001, 21 pages.
Levkowetz et al., "NAT Traversal for Mobil IP using UDP Tunneling", Internet Draft, Jul. 4, 2001, 15 pages.
U.S. Office Action dated Dec. 31, 2008 from related U.S. Appl. No. 10/420,402.
Korean Office Action mailed Jan. 30, 2009 from related KR Application No. 2004-7010144, 2 pgs.
Levkowetz, H. et al., "Mobile IP NAT/NAPT Traversal using UDP Tunneling"; Nov. 8, 2001; ipUnplugged, <draft-levkowetz-vaarala-mobileip-nat-traversal-00.txt>, XP-002238804, 24 pgs.
Notice of Allowance and Allowed Claims dated May 20, 2009 from U.S. Appl. No. 10/420,402; 19 pgs.
KR patent application No. 10-2004-7010144, Notification of Provisional Rejection mailed Aug. 26, 2009.
H. Levkowetz, et al., "Mobile IP NAT/NAPT Traversal using UDP Tunneling"; Mar. 1, 2002; Netseal, URL://www1.tools.ietf.org/html/draft-ietf-mobileip-nat-traversal-01, 27 pages.
CA Office Action dated Jan. 19, 2010, from Canadian Appl. No. 2,472,057.
CA Office Action dated Feb. 2, 2011, from Canadian Appl. No. 2,472,057.
Levkowetz, H. et al., "Mobile IP NAT/NAPT Traversal using UDP Tunneling"; Mar. 1, 2002; Netseal, URL://www1.tools.ietf.org/html/draft-ietf-mobileip-nat-traversal-01 27 pages.
U.S. Office Action dated May 22, 2007 from related U.S. Appl. No. 10/420,402.
U.S. Office Action dated Feb. 4, 2008 from related U.S. Appl. No. 10/420,402.

\* cited by examiner

FIG. 1

(PRIOR ART)

FIG. 2

(PRIOR ART)

FIG. 3

(PRIOR ART)

METHODS AND APPARATUS FOR IMPLEMENTING NAT TRAVERSAL IN MOBILE IP

RELATED APPLICATIONS

This application is a continuation application of application Ser. No. 10/034,302, entitled "METHODS AND APPARATUS FOR IMPLEMENTING NAT TRAVERSAL IN MOBILE IP," filed on Dec. 28, 2001, by Feige et al, which is incorporated herein by reference for all purposes.

BACKGROUND OF THE INVENTION

1. Field of the Invention

The present invention relates to Mobile IP network technology. More particularly, the present invention relates to enabling a Home Agent to set up a tunnel between the Home Agent and a private care-of address.

2. Description of the Related Art

Mobile IP is a protocol which allows laptop computers or other mobile computer units (referred to as "Mobile Nodes" herein) to roam between various sub-networks at various locations—while maintaining internet and/or WAN connectivity. Without Mobile IP or related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 2002 of the IP Routing for Wireless/Mobile Hosts Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

Figure 1:
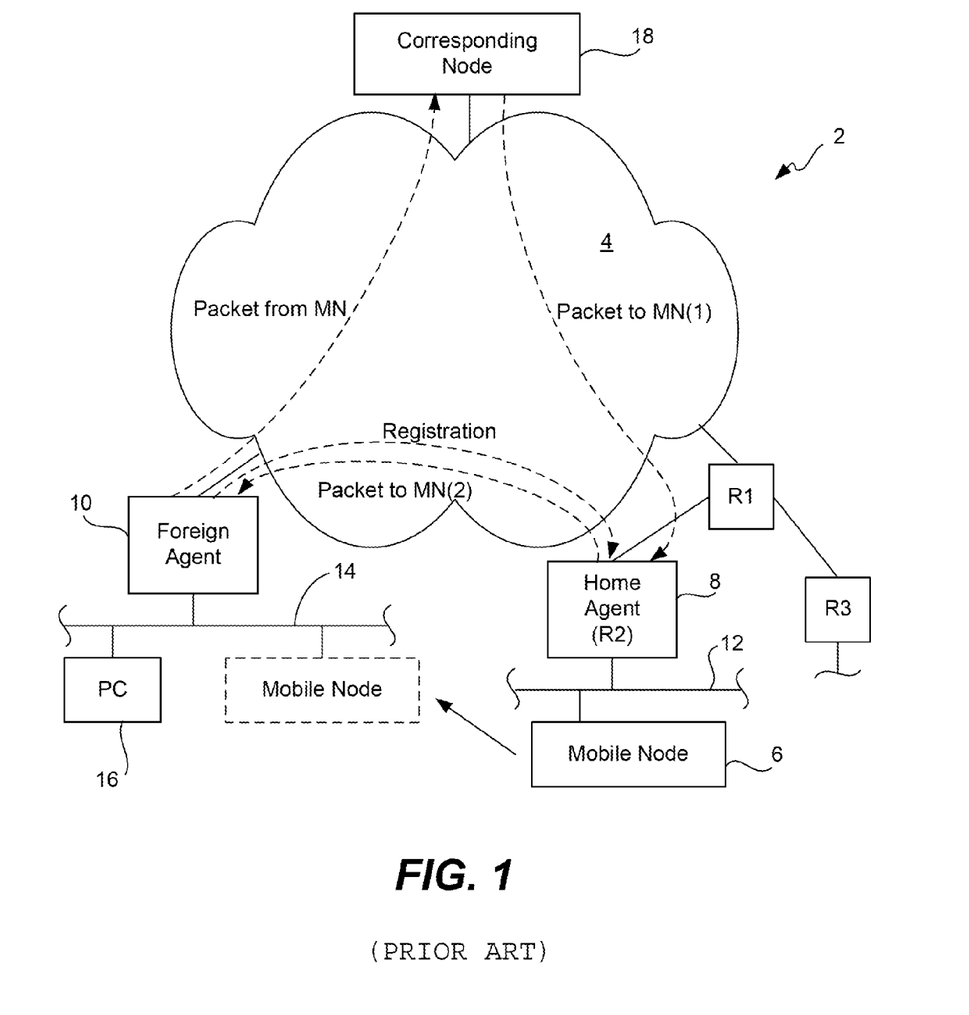
FIG. 1 is a diagram of a Mobile IP network segment and associated environment.

The Mobile IP process and environment are illustrated in FIG. 1. As shown there, a Mobile IP environment 2 includes the internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various agent solicitations and agent advertisements which form part of the Mobile IP protocol. When Mobile Node 6 engages with network segment 14, it composes a registration request for the Home Agent 8 to bind the Mobile Node's current location with its home location. Foreign Agent 10 then relays the registration request to Home Agent 8 (as indicated by the dotted line "Registration"). During the registration process, the Home Agent and the Mobile Node 6 may then negotiate the conditions of the Mobile Node's attachment to Foreign Agent 10. For example, the Mobile Node 6 may request a registration lifetime of 5 hours, but the Home Agent 8 may grant only a 3 hour period. Therefore, the attachment may be limited to a period of time. When the negotiation is successfully completed, Home Agent 8 updates an internal "mobility binding table" which links the Mobile Node's current location via its care-of address (e.g., a collocated care-of address or the Foreign Agent's IP address) to the identity (e.g., home address) of Mobile Node 6. Further, if the Mobile Node 6 registered via a Foreign Agent, the Foreign Agent 10 updates an internal "visitor table" which specifies the Mobile Node address, Home Agent address, etc. In effect, the Mobile Node's home base IP address (associated with segment 12) has been binded to the care-of address such as the Foreign Agent's IP address (associated with segment 14).

Now, suppose that Mobile Node 6 wishes to send a message to a Correspondent Node 18 from its new location. An output message from the Mobile Node is then packetized and forwarded through Foreign Agent 10 over the internet 4 to Correspondent Node 18 (as indicated by the dotted line "packet from MN") according to a standard Internet Protocol. If Correspondent Node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from Correspondent Node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

As indicated above, each mobile node has a designated Home Agent. As specified in RFC 2002, a mobile node is pre-configured with information identifying its Home Agent. In addition, both the mobile node and its Home Agent are also pre-configured with a shared key and Security Parameter Index (SPI) for the shared key, commonly referred to as a security association. Similarly, each Home Agent is pre-configured with information identifying mobile nodes that it supports as well as the corresponding security associations. In this manner, a mobile node is "anchored" to a specific Home Agent to enable it to subsequently register with that Home Agent and receive messages via that Home Agent from Correspondent Nodes.

As described above, when a Mobile Node roams, it typically receives packets sent to it by Correspondent Nodes via a Mobile IP tunnel. Typically, when a Mobile Node registers with its Home Agent, a tunnel is created between the Mobile Node's care-of address (COA) and the Home Agent. However, in order for the Home Agent to reach the COA, the COA must be a public address. Thus, a problem arises when a Mobile Node attempts to register from within a private network.

Mobile operators and service providers assign private IP addresses to their subscribers. More specifically, mobile operators worldwide typically use private Dynamic Host Configuration Protocol (DHCP) or PPP IP Control Protocol (IPCP) address assignment to their mobile users due to the lack of IP addresses. When the users are accessing the internet, the private IP address assigned to a user is translated to a public address at the edge of the private network before the packets are sent via the internet. This function is typically referred to as Network Address Translation (NAT).

When Mobile IP clients attempt to create a Mobile IP session from a private address, the NAT system prevents the Mobile IP session from successfully being established, since the Home Agent will have to terminate its tunnel to the private address, the COA. The NAT system prevents a Mobile IP session from being established when the COA is a private address, either the Foreign Agent's COA or the Mobile Node's co-located care-of address.

In view of the above, it would be desirable if a Mobile IP session could be successfully and efficiently established from a Mobile Node via a private IP address. Moreover, it would be beneficial if such a mechanism could be employed without requiring modifications to the Mobile Node or the encapsulation scheme for both the Mobile Node and the Home Agent.

SUMMARY OF THE INVENTION

The present invention enables a Mobile IP session to be established between a Mobile Node that has roamed to a private network and its Home Agent. More particularly, the Mobile IP session may be established even though the care-of address is a private address rather than a public address. This is accomplished, in part, through the detection of NAT traversal of the registration request packet. In this manner, the Mobile IP session may be established without requiring modifications to the Mobile Node.

Methods and apparatus for establishing communication between a Mobile Node and a Home Agent are disclosed. The Home Agent receives a registration request packet from the Mobile Node, the registration request packet including an IP source address and a Home Agent address. The Home Agent then detects from the registration request packet when network address translation has been performed. When it has been detected that network address translation has been performed, a single tunnel is set up between the Home Agent address and the IP source address.

Various network devices may be configured or adapted for performing the disclosed processes. These network devices include, but are not limited to, routers. Moreover, the functionality for the disclosed processes may be implemented in software as well as hardware. Yet another aspect of the invention pertains to computer program products including machine-readable media on which are provided program instructions for implementing the methods and techniques described herein, in whole or in part. Any of the methods of this invention may be represented, in whole or in part, as program instructions that can be provided on such machine-readable media.

These and other features of the present invention will be described in more detail below in the detailed description of the invention and in conjunction with the following figures.

DETAILED DESCRIPTION OF THE PREFERRED EMBODIMENTS

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

Figure 2:
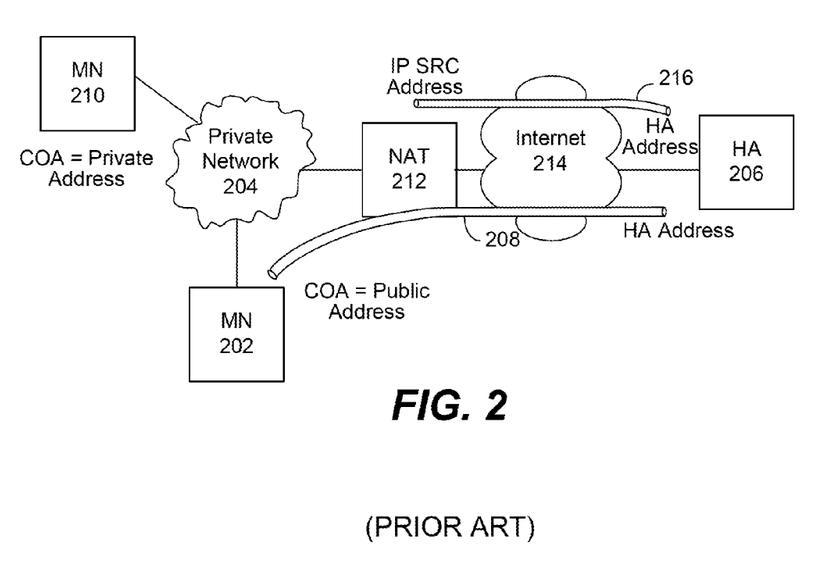
FIG. 2 is a block diagram illustrating the problems associated with the receipt of packets by a Mobile Node within a private network from a Home Agent via a public network.

FIG. 2 is a block diagram illustrating the problems associated with the receipt of packets by a Mobile Node within a private network from a Home Agent via a public network. As shown, when a Mobile Node 202 roams to a private network 204, it typically registers with its Home Agent 206 via a Foreign Agent (not shown). However, the Mobile Node 202 may register via a collocated care-of address rather than a Foreign Agent. In either case, the care-of address is often a public address. Therefore, a tunnel 208 is typically established between the public care-of address and the Home Agent address.

Unfortunately, as described above, when a Mobile Node roams to a private network 204, private addresses are often assigned due to the lack of IP addresses. Thus, when a Mobile Node 210 obtains a collocated care-of address, the care-of address may be a private address rather than a public address. In this case, when the care-of address is a private address, the IP source address of the registration request will also be a private address. As a result, Network Address Translation (NAT) 212 is performed to translate the IP source address to a public address. Thus, when the registration request is transmitted via the Internet 214, the Home Agent 206 will see a legitimate reachable IP source address so that it may send a registration reply to the IP source address. Unfortunately, the Home Agent will not recognize the private care-of address and therefore will not be able to establish a tunnel between the Home Agent and the private care-of address.

In accordance with various embodiments of the invention, the Home Agent 206 detects when NAT has been performed. When NAT has been performed, a tunnel 216 is established between the IP source address and the Home Agent address. In this manner, a Mobile IP session is successfully established by creating a tunnel between the Home Agent and the public IP address.

Figure 3:
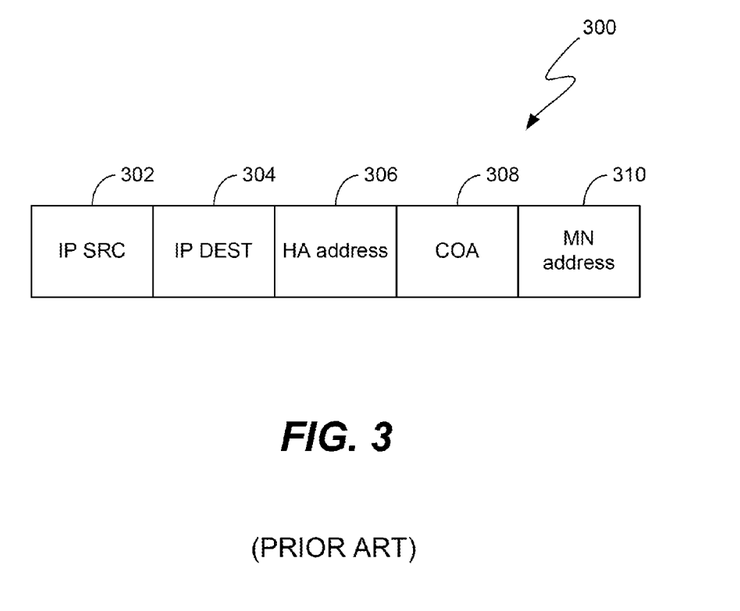
FIG. 3 is a diagram illustrating a conventional registration request packet.

To better illustrate the processes performed by a Home Agent, it is beneficial to illustrate the fields of a registration request packet. FIG. 3 is a diagram illustrating a conventional registration request packet. As shown, a registration request packet 300 typically includes an IP source address 302 and an IP destination address 304. In addition, a Home Agent address 306, care-of address 308, and Mobile Node identifier 310 (e.g., IP address) are also generally provided in the registration request packet.

Figure 4:
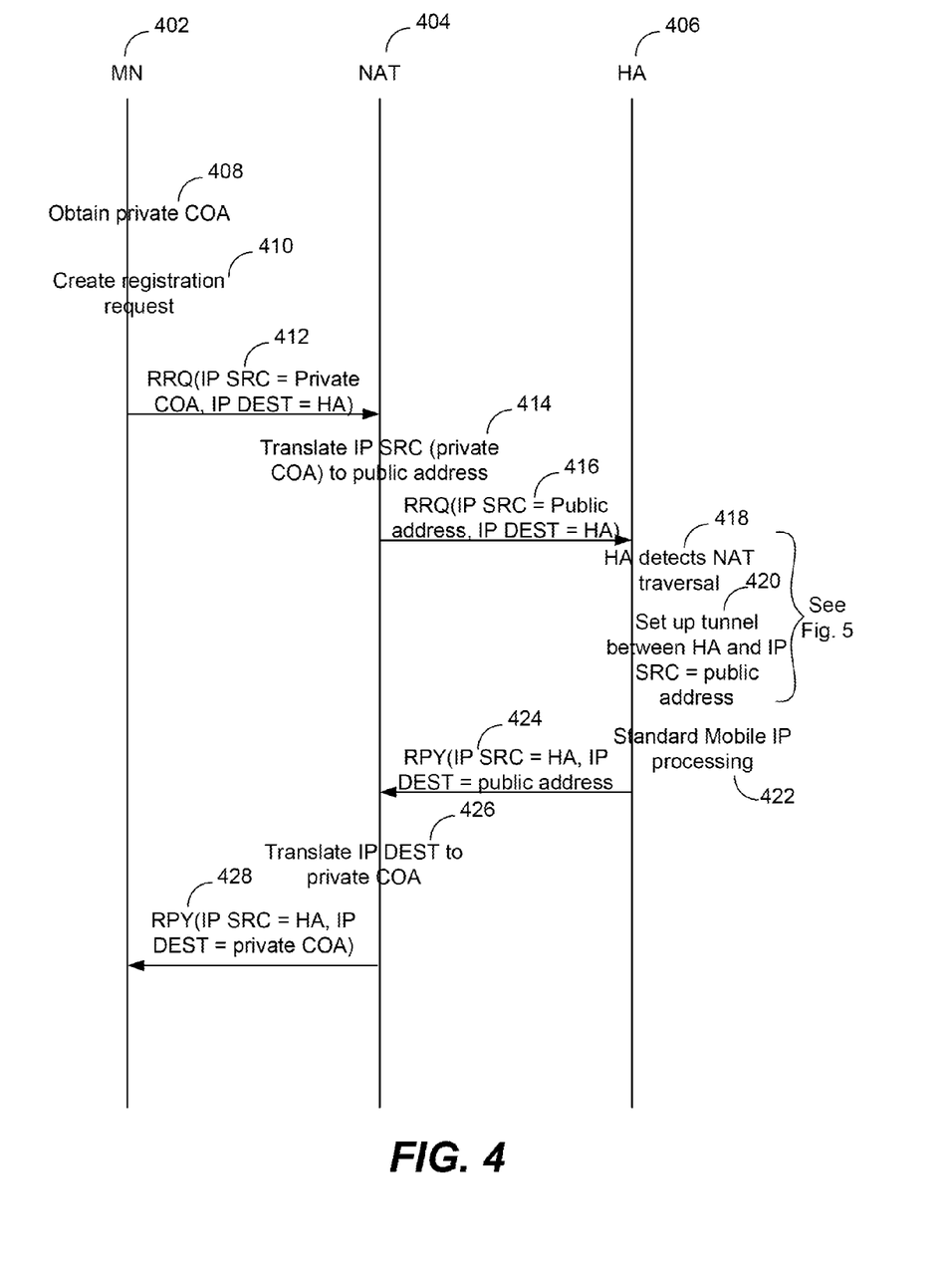
FIG. 4 is a control flow diagram illustrating a method of processing a Mobile IP registration request sent by Mobile Node that has roamed to a private network in accordance with various embodiments of the invention.

FIG. 4 is a control flow diagram illustrating a method of processing a Mobile IP registration request sent by Mobile Node that has roamed to a private network in accordance with various embodiments of the invention. A Mobile Node, NAT module, and Home Agent are represented by corresponding vertical lines 402, 404, and 406, respectively, while interaction between these entities are represented by horizontal lines. As shown, the Mobile Node 402 obtains a private care-of address at 408 and composes a registration request at 410. In other words, rather than registering via a Foreign Agent, the Mobile Node 402 is registering via a collocated care-of address. The Mobile Node 402 then sends the registration request at 412 to the NAT module 404. In this example, since the Mobile Node has obtained a collocated care-of address and it has roamed to a private network, the IP source address will be equal to the private care-of address. The IP destination address is equal to the Home Agent address.

When the NAT module 404 receives the registration request, it translates the IP source address (which is equal to the private care-of address) to a public address at 414. The registration request is then sent at 416 to the Home Agent 406. At this point, the IP source address is a public address, while the care-of address is a private address.

When the Home Agent 406 receives the registration request packet, the Home Agent 406 detects from the registration request packet when network address translation of the IP source address has been performed as shown at 418. When it has been detected that network address translation of the IP source address has been performed, a tunnel is set up between the Home Agent address and the IP source address (which is now a public address) at 420. In other words, since the IP source address was previously equal to the private care-of address, the translated IP source address is a translation of the private care-of address. In this manner, the tunnel is set up between the Home Agent and the care-of address. Standard Mobile IP processing is performed at 422. These processes performed by the Home Agent 406 will be described in further detail below with reference to FIG. 5. For instance, a mobility binding table is updated with a binding for the Mobile Node that includes the tunnel that has been set up between the Home Agent and the public IP source address.

The Home Agent then sends a registration reply packet at 424 to the NAT module 404. In other words, the IP source address of the registration reply packet is equal to the Home Agent address while the IP destination address is equal to the public IP source address (the translated care-of address) of the registration request packet. The NAT module then translates the IP destination address to the private care-of address at 426 and sends the registration reply packet at 428 to the Mobile Node 402. As shown, the IP destination address of the registration reply packet is now equal to the private care-of address, while the IP source address is equal to the Home Agent address.

Figure 5:
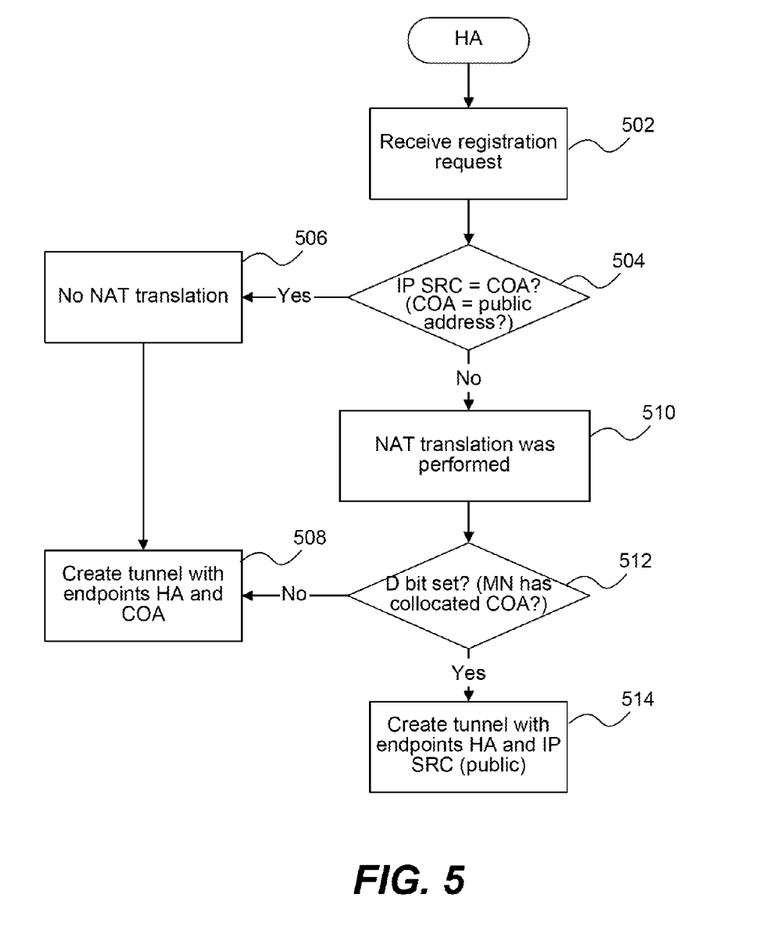
FIG. 5 is a method of processing a registration request by a Home Agent in accordance with various embodiments of the invention.

As described above with respect to FIG. 4, the Home Agent detects NAT translation and establishes a tunnel accordingly. FIG. 5 is a method of processing a registration request by a Home Agent in accordance with various embodiments of the invention. As shown at block 502 the Home Agent receives the registration request. It then determines whether NAT translation has been performed. In accordance with one embodiment, the Home Agent determines whether NAT translation has been performed by determining whether the IP source address of the registration request packet is equal to the care-of address specified in the registration request packet at block 504. If they are equal, no NAT has been performed as shown at block 506. In other words, the IP source address and the care-of address are both public addresses. A tunnel is therefore created in a conventional manner between the public care-of address and the Home Agent address at block 508.

When it is determined at block 504 that the IP source address specified in the registration request packet is no longer equal to the care-of address specified in the registration request packet, this means that NAT has been performed as shown at 510. In other words, the IP source address is a public address while the care-of address is a private address. Therefore, a tunnel cannot be established between the care-of address and the Home Agent address.

In accordance with various embodiments of the invention, the Home Agent also detects whether the Mobile Node has registered via a collocated care-of address rather than via a Foreign Agent. This may be accomplished by determining whether the direct encapsulation bit (D bit) of the registration request packet is set as shown at block 512. A tunnel is then set up between the Home Agent address and the public IP source address at block 514. If the D bit is not set, the tunnel is established between the Home Agent address and the care-of address at block 508.

Figure 6:
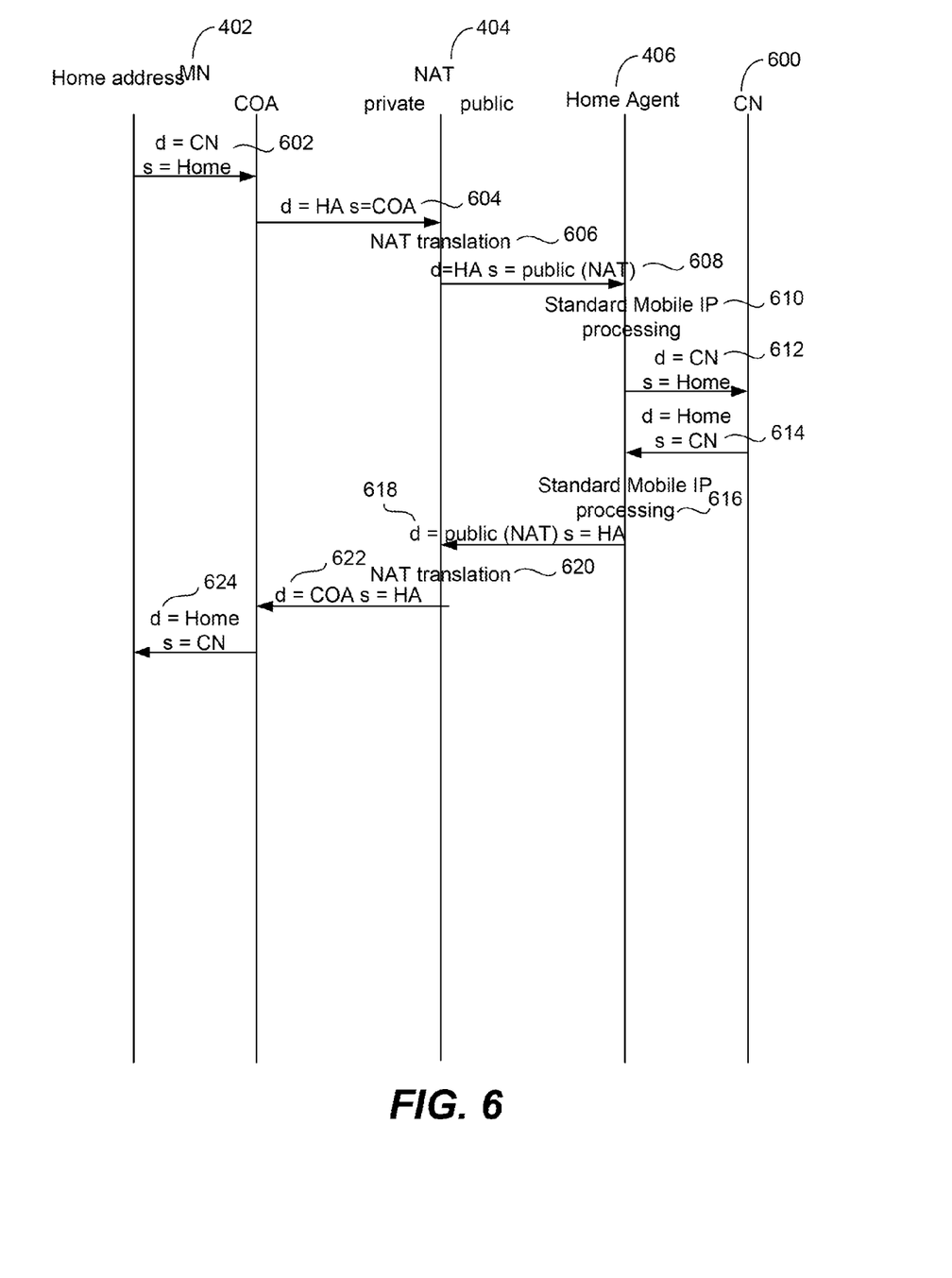
FIG. 6 is a data flow diagram illustrating the flow of data between a Mobile Node that has roamed to a private network and a Corresponding Node in a public network after creation of a tunnel as described above with reference to FIG. 4 and FIG. 5.

FIG. 6 is a data flow diagram illustrating the flow of data between a Mobile Node that has roamed to a private network and a Corresponding Node in a public network after creation of a tunnel as described above with reference to FIG. 4 and FIG. 5. As shown, when a Mobile Node sends a data packet, it sends the data packet at 602 with the IP source address equal to the Home Address of the Mobile Node and the IP destination address equal to the IP address of the Corresponding Node 600. The data packet is then tunneled at 604 such that the packet is encapsulated with the IP source address equal to the collocated care-of address and the IP destination address equal to the Home Agent address. At 606 the NAT module translates the IP source address from the private care-of address to a public address. The packet is then sent at 608 to the Home Agent. The Home Agent performs standard Mobile IP processing and decapsulates the packet at 610. The Home Agent then sends the data packet at 612 to the Corresponding Node. As shown, the IP source address is the Home Address of the Mobile Node and the IP destination address is the IP address of the Corresponding Node.

When the Corresponding Node sends a data packet to the Mobile Node, the Corresponding Node composes a data packet having an IP source address equal to the IP address of the Corresponding Node and an IP destination address equal to the Home Address of the Mobile Node. The Corresponding Node then sends the data packet at 614, which is intercepted by the Home Agent. The Home Agent performs standard Mobile IP processing at 616. The Home Agent then tunnels the data packet at 618 corresponding to the previously established tunnel (stored in the mobility binding table). More specifically, the data packet is encapsulated with the IP source address equal to the Home Agent address and the destination IP address equal to the public address (previously translated by the NAT module). The NAT module then translates the public IP destination address to the private care-of address at 620. The NAT module then tunnels the packet at 622 to the private care-of address at 622. The packet is then de-capsulated and sent to the Home Address of the Mobile Node at 624.

Other Embodiments

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, the Home Agents of this invention may be implemented in specially configured routers or servers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 7:
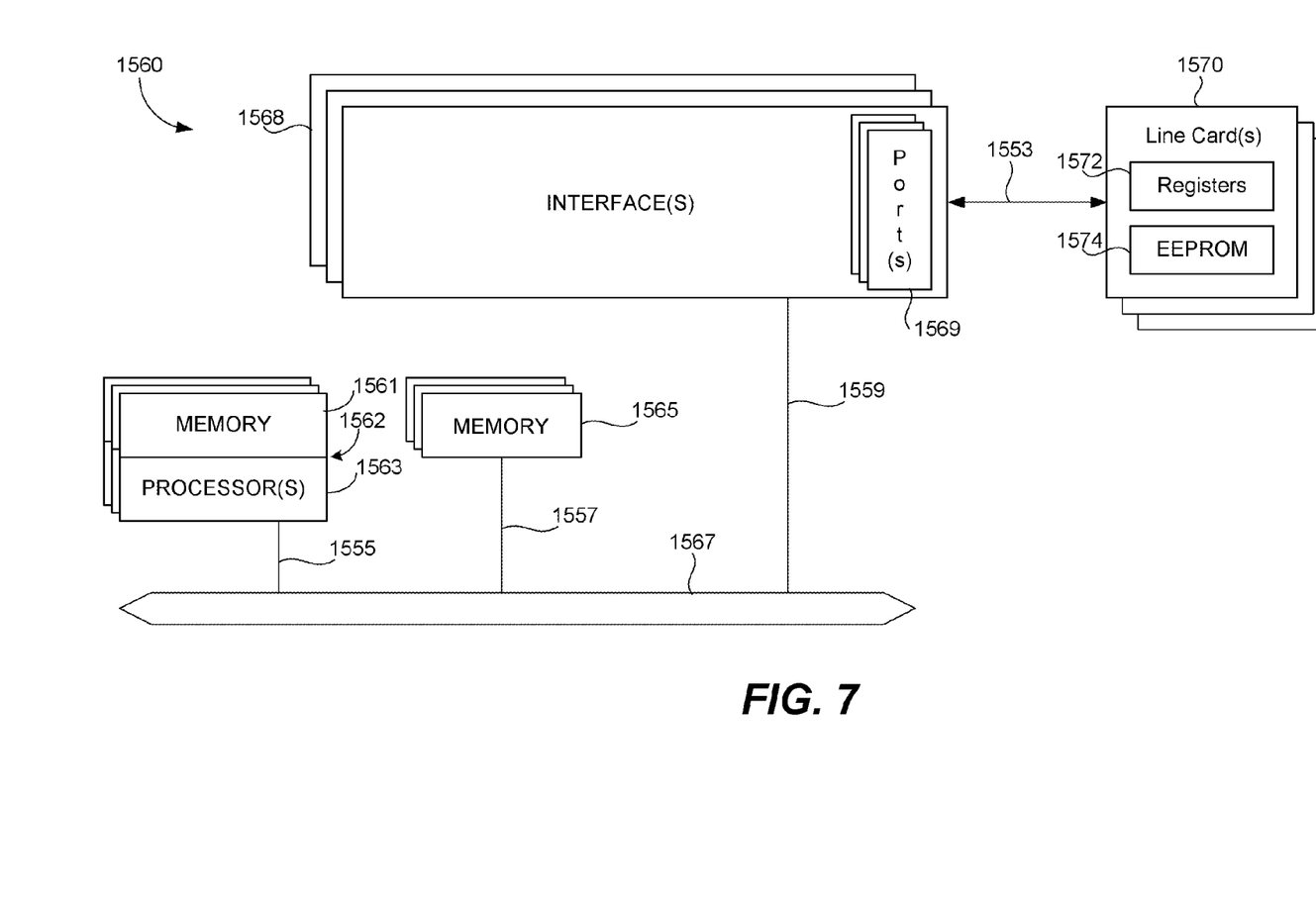
FIG. 7 is a diagram illustrating an exemplary network device in which embodiments of the invention may be implemented.

Referring now to FIG. 7, a network device 1560 suitable for implementing the techniques of the present invention includes a master central processing unit (CPU) 1562, interfaces 1568, and a bus 1567 (e.g., a PCI bus). When acting under the control of appropriate software or firmware, the CPU 1562 may be responsible for implementing specific functions associated with the functions of a desired network device. For example, when configured as an intermediate router, the CPU 1562 may be responsible for analyzing packets, encapsulating packets, and forwarding packets for transmission to a set-top box. The CPU 1562 preferably accomplishes all these functions under the control of software including an operating system (e.g. Windows NT), and any appropriate applications software.

CPU 1562 may include one or more processors 1563 such as a processor from the Motorola family of microprocessors or the MIPS family of microprocessors. In an alternative embodiment, processor 1563 is specially designed hardware for controlling the operations of network device 1560. In a specific embodiment, a memory 1561 (such as non-volatile RAM and/or ROM) also forms part of CPU 1562. However, there are many different ways in which memory could be coupled to the system. Memory block 1561 may be used for a variety of purposes such as, for example, caching and/or storing data, programming instructions, etc.

The interfaces 1568 are typically provided as interface cards (sometimes referred to as "line cards"). Generally, they control the sending and receiving of data packets over the network and sometimes support other peripherals used with the network device 1560. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1562 to efficiently perform routing computations, network diagnostics, security functions, etc.

Although the system shown in FIG. 7 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 1565) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. However, it should be understood that the invention is not limited to such implementations, but instead would equally apply regardless of the context and system in which it is implemented. Thus, broadly speaking, the operations described above may be used with respect to other mobility agents, such as Foreign Agents. In addition, the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

What is claimed is:

1. A Home Agent supporting Mobile IP, the Home Agent being adapted for establishing communication between a Mobile Node and the Home Agent, comprising:
   a processor; and
   a memory, at least one of the processor and the memory being adapted for:
      receiving a registration request packet from a Mobile Node, the registration request packet including an IP source address and a Home Agent address;
      detecting from the registration request packet whether network address translation of the IP source address has been performed prior to receiving the registration request packet; and
      setting up a tunnel between the Home Agent address and the IP source address according to whether the Home Agent has detected that network address translation of the IP source address has been performed prior to receiving the registration request packet.

2. The Home Agent as recited in claim 1, wherein the registration request packet further includes a care-of address, and wherein detecting from the registration request packet whether network address translation of the source IP address has been performed prior to receiving the registration request comprises:
   determining whether the IP source address is equal to the care-of address;
   wherein network address translation has been performed when the IP source address is not equal to the care-of address.

3. The Home Agent as recited in claim 1, wherein the registration request packet further includes a direct encapsulation bit and a care-of address, and wherein detecting from the registration request packet whether network address translation of the source IP address has been performed prior to receiving the registration request comprises:
   determining whether the IP source address is equal to the care-of address; and
   determining whether the direct encapsulation bit is set;
   wherein network address translation has been performed when the IP source address is not equal to the care-of address and when the direct encapsulation bit is set.

4. The Home Agent as recited in claim 1, wherein the registration request packet includes a direct encapsulation bit, at least one of the processor and the memory being further adapted for:
   determining from the direct encapsulation bit whether the Mobile Node has a collocated care-of address;
   wherein setting up a tunnel between the Home Agent address and the IP source address is performed when the Mobile Node has a collocated care-of address.

5. The Home Agent as recited in claim 1, at least one of the processor and the memory being further adapted for:
   determining whether the registration request packet has been received from a Foreign Agent;
   wherein setting up a tunnel between the Home Agent address and the IP source address is performed when the registration request packet has not been received from a Foreign Agent.

6. The Home Agent as recited in claim 1, wherein the registration request packet further includes a care-of address, at least one of the processor and the memory being further adapted for:
   when it has been detected that network address translation has not been performed, setting up a tunnel between the Home Agent address and the care-of address.

7. The Home Agent as recited in claim 1, wherein the registration request packet further includes a care-of address, and wherein detecting from the registration request packet whether network address translation has been performed on the source IP address prior to receiving the registration request packet comprises:
   determining whether the care-of address is a private address;
   wherein network address translation has been performed when the care-of address is a private address.

8. The Home Agent as recited in claim 7, wherein determining whether the care-of address is a private address comprises:
   determining whether the IP source address is equal to the care-of address;
   wherein network address translation has been performed when the IP source address is not equal to the care-of address.

9. The Home Agent as recited in claim 7, wherein the IP source address is a public address.

10. The Home Agent as recited in claim 1, at least one of the processor and the memory being further adapted for:
    updating a mobility binding table with an entry associating the Mobile Node with the tunnel.

11. The Home Agent as recited in claim 1, at least one of the processor and the memory being further adapted for:
    composing a registration reply packet, the registration reply packet including an IP destination address, the IP destination address being equal to the IP source address of the registration request packet; and
    sending the registration reply packet to the IP destination address.

12. The Home Agent as recited in claim 1, wherein the registration request packet further includes a care-of address, at least one of the processor and the memory being further adapted for:
    when it has been detected that network address translation has been performed, setting up a tunnel between the Home Agent address and the IP source address.

13. The Home Agent as recited in claim 1, wherein the tunnel is not a UDP tunnel.

14. The Home Agent as recited in claim 1, wherein the network address translation of the IP source address of the registration request packet translates the IP source address of the registration request packet from a private address to a public address.

15. The Home Agent as recited in claim 1, wherein a care-of address of the registration request packet is a private address.

16. The Home Agent as recited in claim 15, wherein network address translation has not been performed on the care-of address prior to receiving the registration request packet.

17. The Home Agent as recited in claim 1, wherein the network address translation translates between private addresses and public addresses.

18. The Home Agent as recited in claim 1, wherein setting up a tunnel between the Home Agent address and the IP source address according to whether the Home Agent has detected that network address translation of the IP source address has been performed prior to receiving the registration request comprises:
   setting up a tunnel between the Home Agent address and the IP source address;
   wherein the Home Agent does not set up a tunnel between the Home Agent address and a care-of address specified in the registration request packet.

19. In a Home Agent supporting Mobile IP, a method of establishing communication between a Mobile Node and a Home Agent, comprising:
   receiving by the Home Agent a registration request packet from a Mobile Node, the registration request packet including an IP source address, a Home Agent address, and a care-of address;
   detecting by the Home Agent whether network address translation of the IP source address of the registration request packet has been performed prior to receiving the registration request packet by the Home Agent; and
   setting up a tunnel between the Home Agent address and the IP source address if the Home Agent has detected that network address translation of the IP source address has been performed prior to receiving the registration request packet.

20. The method as recited in claim 19, wherein the tunnel is not a UDP tunnel.

21. The method as recited in claim 19, wherein setting up a tunnel between the Home Agent address and the IP source address if the Home Agent has detected that network address translation of the IP source address has been performed prior to receiving the registration request packet is performed without setting up a tunnel between the Home Agent and a care-of address specified in the registration request packet.

22. In a Home Agent supporting Mobile IP, a method of establishing communication between a Mobile Node and a Home Agent, comprising:
   receiving by the Home Agent a registration request packet from a Mobile Node, the registration request packet including an IP source address, a Home Agent address, and a care-of address;
   determining by the Home Agent from the registration request packet whether network address translation of the IP source address has been performed prior to receiving the registration request packet; and
   setting up a tunnel between either the Home Agent address and the IP source address or the Home Agent address and the care-of address according to whether the Home Agent has determined that network address translation of the IP source address has been performed prior to receiving the registration request packet.

23. The method of claim 22, wherein setting up a tunnel between either the Home Agent address and the IP source address or the Home Agent address and the care-of address according to whether it has been determined that network address translation of the IP source address has been performed comprises:
   setting up a tunnel between the Home Agent address and the IP source address when the Home Agent has determined that network address translation of the IP source address has been performed.

24. The method of claim 23, wherein when the Home Agent has determined that network address translation of the IP source address has been performed, a tunnel between the Home Agent address and the care-of address is not established by the Home Agent.

25. The method of claim 22, wherein setting up a tunnel between either the Home Agent address and the IP source address or the Home Agent address and the care-of address according to whether the Home Agent has determined that network address translation of the IP source address has been performed prior to receiving the registration request comprises:
   setting up a tunnel between the Home Agent address and the care-of address when it has been determined that network address translation has not been performed.

26. The method of claim 25, wherein when the Home Agent has determined that network address translation of the IP source address has not been performed, a tunnel between the Home Agent and the IP source address is not generated by the Home Agent.

27. The method as recited in claim 22, wherein the tunnel is not a UDP tunnel.

28. The method as recited in claim 22, wherein the network address translation of the IP source address of the registration request packet translates the IP source address of the registration request packet from a private address to a public address.

29. The method as recited in claim 22, wherein a care-of address of the registration request packet is a private address.

30. The method as recited in claim 29, wherein network address translation has not been performed on the care-of address prior to receiving the registration request packet by the Home Agent.

31. The method as recited in claim 22, wherein the network address translation translates between private addresses and public addresses.

32. The method as recited in claim 22, wherein setting up a tunnel between the Home Agent address and the IP source address according to whether the Home Agent has detected that network address translation of the IP source address has been performed prior to receiving the registration request comprises:
   setting up a tunnel between the Home Agent address and the IP source address;
   wherein the Home Agent does not set up a tunnel between the Home Agent address and a care-of address specified in the registration request packet.

33. A Home Agent supporting Mobile IP, the Home Agent being adapted for establishing communication between a Mobile Node and the Home Agent, comprising:
   means for receiving a registration request packet from a Mobile Node, the registration request packet including an IP source address and a Home Agent address;
   means for detecting from the registration request packet whether network address translation of the IP source address has been performed prior to receiving the registration request; and
   means for setting up a tunnel between the Home Agent address and the IP source address according to whether the Home Agent has detected that network address translation of the IP source address has been performed prior to receiving the registration request.

* * * * *